United States Patent
Onishi et al.

(10) Patent No.: US 8,586,640 B2
(45) Date of Patent: Nov. 19, 2013

(54) HYDROCARBON SYNTHESIS REACTION APPARATUS, HYDROCARBON SYNTHESIS REACTION SYSTEM, AND HYDROCARBON SYNTHESIZING METHOD

(75) Inventors: Yasuhiro Onishi, Tokyo (JP); Eiichi Yamada, Tokyo (JP)

(73) Assignees: Japan Oil, Gas and Metals National Corporation, Kanagawa (JP); Inpex Corporation, Tokyo (JP); JX Nippon Oil & Energy Corporation, Tokyo (JP); Japan Petroleum Exploration Co., Ltd., Tokyo (JP); Cosmo Oil Co., Ltd., Tokyo (JP); Nippon Steel Engineering Co., Ltd., Tokyo (JP)

( * ) Notice: Subject to any disclaimer, the term of this patent is extended or adjusted under 35 U.S.C. 154(b) by 268 days.

(21) Appl. No.: 12/998,191

(22) PCT Filed: Sep. 25, 2009

(86) PCT No.: PCT/JP2009/004875
§ 371 (c)(1),
(2), (4) Date: May 3, 2011

(87) PCT Pub. No.: WO2010/038391
PCT Pub. Date: Apr. 8, 2010

(65) Prior Publication Data
US 2011/0201696 A1 Aug. 18, 2011

(30) Foreign Application Priority Data
Sep. 30, 2008 (JP) .................. 2008-253215

(51) Int. Cl.
*C07C 27/00* (2006.01)
*B01J 8/18* (2006.01)
*B01J 10/00* (2006.01)

(52) U.S. Cl.
USPC ............ 518/700; 518/704; 422/140; 422/187

(58) Field of Classification Search
USPC ........................ 518/700, 704; 422/140, 187
See application file for complete search history.

(56) References Cited

U.S. PATENT DOCUMENTS

| 2002/0035163 A1* | 3/2002 | Vogel et al. | 518/728 |
| 2005/0032919 A1* | 2/2005 | Huisman et al. | 518/702 |

(Continued)

FOREIGN PATENT DOCUMENTS

| EP | 0930268 | 7/1999 |
| JP | 2001-517645 | 10/2001 |

(Continued)

OTHER PUBLICATIONS

European Search Report dated Feb. 10, 2012, issued in corresponding European application No. 09817434.5.

(Continued)

*Primary Examiner* — Jafar Parsa
(74) *Attorney, Agent, or Firm* — Kenyon & Kenyon LLP (57) ABSTRACT

A hydrocarbon synthesis reaction apparatus which synthesizes a hydrocarbon compound by a chemical reaction of a synthesis gas including hydrogen and carbon monoxide as the main components, and a slurry having solid catalyst particles suspended in a liquid, the hydrocarbon synthesis reaction apparatus is provided with: a reactor which contains the slurry; a synthesis gas introduction part which introduces the synthesis gas into the reactor; and a synthesis gas heating part which is provided in the synthesis gas introduction part to heat the synthesis gas introduced into the reactor to the decomposition temperature of carbonyl compounds or higher.

7 Claims, 1 Drawing Sheet

(56) References Cited

U.S. PATENT DOCUMENTS

2005/0035326 A1 2/2005 Meyer et al.
2010/0005965 A1* 1/2010 Kodde ................... 95/148

FOREIGN PATENT DOCUMENTS

| | | |
|---|---|---|
| JP | 2002-520423 | 7/2002 |
| JP | 2005-58996 | 3/2005 |
| JP | 2007-533662 | 11/2007 |
| WO | WO 99/15484 | 4/1999 |
| WO | WO 00/02644 | 1/2000 |
| WO | 02/096839 | 12/2002 |
| WO | WO 2005/103211 | 11/2005 |
| WO | 2007/131082 | 11/2007 |

OTHER PUBLICATIONS

International Search Report dated Oct. 27, 2009 issued in corresponding PCT Application No. PCT/JP2009/004875.
Liu et al., "Deactivation model of Fischer-Tropsch synthesis over an Fe—Cu—K commercial catalyst" Appl.Catal.A Gen. vol. 161, No. 1/2, 1997, pp. 137-151 [as cited in the International Search Report].
Liu et al., "Deactivation model of Fischer-Tropsch synthesis over an Fe—Cu—K commercial catalyst" Appl.Catal.A Gen. vol. 161, No. 1/2, 1997, pp. 137-151.

* cited by examiner

HYDROCARBON SYNTHESIS REACTION APPARATUS, HYDROCARBON SYNTHESIS REACTION SYSTEM, AND HYDROCARBON SYNTHESIZING METHOD

TECHNICAL FIELD

The present invention relates to a hydrocarbon synthesis reaction apparatus which synthesizes a hydrocarbon compound by introducing a synthesis gas including hydrogen gas and carbon monoxide gas as the main components into a slurry having solid catalyst particles suspended in a liquid, a hydrocarbon synthesis reaction system including the same, and a hydrocarbon synthesizing method.

This application is a national stage application of International Application No. PCT/JP2009/004875, filed Sep. 25, 2009, which claims priority to Priority is claimed en Japanese Patent Application No. 2008-253215, filed Sep. 30, 2008, the content of which is incorporated herein by reference.

BACKGROUND ART

As one of the methods for synthesizing liquid fuels from natural gas, a GTL (Gas to Liquids: liquid fuel synthesis) technique of reforming natural gas to produce synthesis gas containing carbon monoxide gas (CO) and hydrogen gas ($H_2$) as the main components, synthesizing liquid hydrocarbons as a hydrocarbon compound by the Fischer-Tropsch synthesis reaction (hereinafter referred to as "FT synthesis reaction"), with this synthesis gas as a source gas, and further hydrogenating and refining the liquid hydrocarbons to produce liquid fuel products, such as naphtha (raw gasoline), kerosene, gas oil, and wax, has recently been developed.

As a hydrocarbon synthesis reaction system which produces liquid fuels using this GTL technique, as shown in the following Patent Document 1, a configuration including a hydrocarbon synthesis reaction apparatus which synthesizes a hydrocarbon compound by a chemical reaction, such as an FT synthesis reaction, of a synthesis gas and a slurry having solid catalyst particles suspended in a liquid is known. This hydrocarbon synthesis reaction apparatus includes a reactor which contains the slurry, and a synthesis gas introduction part which allows the synthesis gas to be introduced into the reactor. In this hydrocarbon synthesis reaction apparatus, the synthesis gas introduction part is composed of, for example, a steel pipe or the like, and the synthesis gas, which has flowed through the synthesis gas introduction part and has been introduced into the reactor, chemically reacts using the catalyst particles suspended in the slurry in the reactor as a catalyst, whereby liquid hydrocarbons are synthesized.

CITATION LIST

Patent Document

[PATENT DOCUMENT 1] PCT Japanese Translation Patent Publication No. 2007-533662

SUMMARY OF THE INVENTION

Problem that the Invention is to Solve

However, when the synthesis gas flows through the synthesis gas introduction part in the above conventional hydrocarbon synthesis reaction system, the carbon monoxide in the synthesis gas may act on iron, nickel, etc. in steel material which constitute the synthesis gas introduction part, and carbonyl compounds (for example, an iron-carbonyl compound and a nickel-carbonyl compound) may be generated. When the carbonyl compounds act on the catalyst particles in the slurry, there is a possibility that the catalyst particles may deteriorate. Therefore, when the carbonyl compound generated within the synthesis gas introduction part is introduced into the reactor and supplied to the slurry, the catalyst particles may deteriorate in a short period of time. As a result, there is a problem in that the hydrocarbon compound cannot be efficiently synthesized and it is difficult to realize a low cost of synthesis of the hydrocarbon compound.

The present invention was made in view of the aforementioned situations, and the object thereof is to provide a hydrocarbon synthesis reaction apparatus, a hydrocarbon synthesizing method, and a hydrocarbon synthesis reaction system including the hydrocarbon synthesis reaction apparatus, which can suppress the deterioration of the catalyst particles in the slurry, efficiently synthesize a hydrocarbon compound, and synthesize the hydrocarbon compound at a low cost.

Means for Solving the Problem

In order to solve the above problems, the invention proposes the following means.

The hydrocarbon synthesis reaction apparatus according to the present invention is a hydrocarbon synthesis reaction apparatus which synthesizes a hydrocarbon compound by a chemical reaction of a synthesis gas including hydrogen and carbon monoxide as the main components, and a slurry having solid catalyst particles suspended in a liquid, the hydrocarbon synthesis reaction apparatus is provided with: a reactor which contains the slurry; a synthesis gas introduction part which introduces the synthesis gas into the reactor; and a synthesis gas heating part which is provided in the synthesis gas introduction part to heat the synthesis gas introduced into the reactor to the decomposition temperature of carbonyl compounds or higher.

Particularly, according to the hydrocarbon synthesis reaction apparatus related to the present invention, the synthesis gas heating part is provided in the synthesis gas introduction part to heat the synthesis gas introduced into the reactor to the decomposition temperature of a carbonyl compound or higher. Thus, the carbonyl compound included in the synthesis gas in the synthesis gas introduction part can be decomposed before being supplied to the slurry contained in the reactor. For this reason, it is possible to suppress the deterioration of the catalyst particles in the slurry and to efficiently synthesize a hydrocarbon compound. As a result, a hydrocarbon compound can be synthesized at a low cost as compared with the case where there is no synthesis gas heating part.

Furthermore, the carbonyl compound may be an iron-carbonyl compound or a nickel-carbonyl compound.

Moreover, preferably, the hydrocarbon synthesis reaction apparatus according to the present invention may further include a reactor gas outlet part which draws gas in the reactor heated by the heat generated by the chemical reaction therethrough, wherein the synthesis gas heating part may include a drawn gas heat-exchange part which heats the synthesis gas by using the heat of the gas drawn from the reactor gas outlet part.

In this case, the gas in the reactor heated by the heat generated by the chemical reaction can be drawn from the reactor gas outlet part, and the synthesis gas introduced into the reactor can be heated by the drawn gas heat-exchange part using the heat of this drawn gas. Accordingly, it is possible to effectively use the heat generated by the chemical reaction to enhance the energy efficiency of the hydrocarbon synthesis reaction apparatus, and it is possible to save energy.

Furthermore, in the hydrocarbon synthesis reaction apparatus according to the present invention, the synthesis gas heating part may further include a steam heat-exchange part which heats the synthesis gas by using steam.

In this case, since the synthesis gas heating part includes the steam heat-exchange part using steam separately from the drawn gas heat-exchange part, the synthesis gas can be heated reliably by steam even before the chemical reaction within the reactor. For this reason, the deterioration of the catalyst particles in the slurry can be more reliably suppressed.

Moreover, after the chemical reaction is performed within the reactor, the synthesis gas can be heated using both the drawn gas heat-exchange part and the steam heat-exchange part. Thus, it is possible to reduce the amount of the steam used for the steam heat-exchange part, and it is possible to attain energy savings and a low running cost of the steam heat-exchange part.

Furthermore, in the hydrocarbon synthesis reaction apparatus according to the present invention, the synthesis gas heating part may heat the synthesis gas to 140° C. or higher and a reaction temperature or lower inside the reactor.

In this case, since the synthesis gas heating part heats the synthesis gas to 140° C. or higher which is the decomposition temperature of $Fe_3(CO)_{12}$ (dodecacarbonyl triiron), the iron-carbonyl compound included in the synthesis gas in the synthesis gas introduction part can be reliably decomposed.

Moreover, the hydrocarbon synthesis reaction system according to the present invention includes the hydrocarbon synthesis reaction apparatus according to the present invention, a synthesis gas production unit which reforms a hydrocarbon raw material to produce the synthesis gas, and introduces the synthesis gas to the synthesis gas introduction part of the hydrocarbon synthesis reaction apparatus; and an upgrading unit which refines the hydrocarbon compounds into liquid fuels.

Since the hydrocarbon synthesis reaction system according to the present invention includes the hydrocarbon synthesis reaction apparatus which can efficiently synthesize hydrocarbon compounds at a low cost, liquid fuels can be efficiently produced at a low cost.

Further, in the hydrocarbon synthesis reaction system according to the present invention, the synthesis gas heating part may heat the synthesis gas in the synthesis gas introduction part by using steam generated when the hydrocarbon raw material is reformed in the synthesis gas production unit.

In this case, since the synthesis gas heating part heats the synthesis gas using the steam generated when a hydrocarbon raw material is reformed in the synthesis gas production unit, when a heat source facility which supplies a heat required for the synthesis gas heating part is separately provided, and the calorific power required for the heat source facility can be made small. Therefore, the hydrocarbon synthesis reaction system can be compact, and the facility cost and running cost can be reduced.

Furthermore, the hydrocarbon synthesizing method according to the present invention is a hydrocarbon synthesizing method which synthesizes a hydrocarbon compound by a chemical reaction of a synthesis gas including hydrogen and carbon monoxide as the main components, and slurry having solid catalyst particles suspended in a liquid, the method is provided with: heating the synthesis gas to the decomposition temperature of a carbonyl compound or higher before the synthesis gas is supplied to the slurry.

According to the hydrocarbon synthesis method related to the present invention, before the synthesis gas is supplied to the slurry, this synthesis gas can be heated to the decomposition temperature or higher of a carbonyl compound, and the carbonyl compound included in the synthesis gas can be decomposed. For this reason, it is possible to suppress the deterioration of the catalyst particles in the slurry and to efficiently synthesize a hydrocarbon compound. As a result, a hydrocarbon compound can be synthesized at a low cost as compared with the case where heating is not performed.

Advantage of Invention

According to the hydrocarbon synthesis reaction apparatus and the hydrocarbon synthesizing method related to the present invention; it is possible to suppress the deterioration of the catalyst particles in the slurry, efficiently synthesize a hydrocarbon compound and synthesize the hydrocarbon compound at a low cost.

Furthermore, since the hydrocarbon synthesis reaction system according to the present invention includes the hydrocarbon synthesis reaction apparatus, production of liquid fuels can be efficiently performed at a low cost.

DESCRIPTION OF EMBODIMENTS

Hereinafter, the preferred embodiments of the invention will be described in detail with reference to the accompanying drawing.

Figure 1:
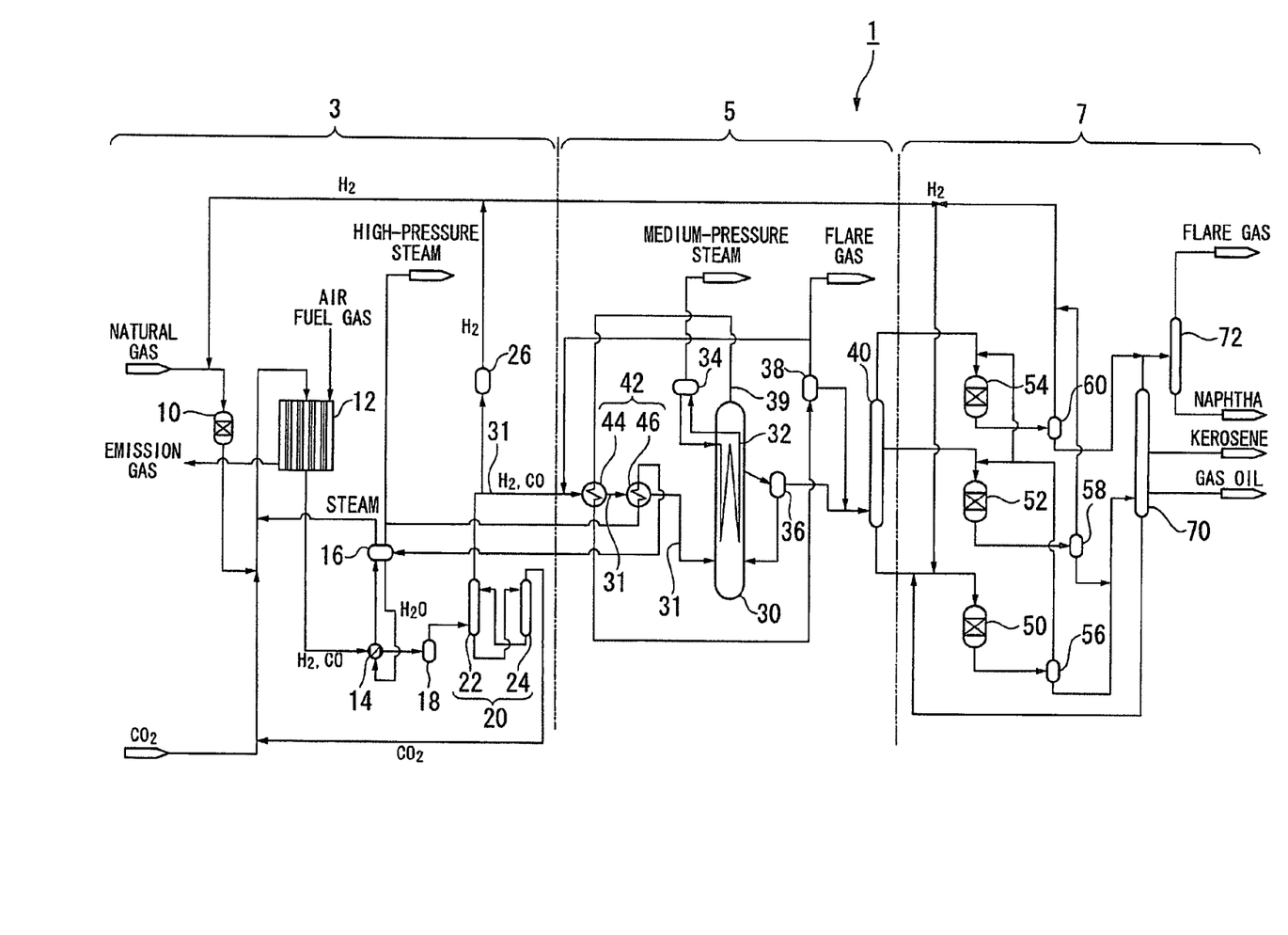
FIG. 1 is a view showing the overall configuration of liquid-fuel synthesizing system of one embodiment according to the present invention.

First, with reference to FIG. 1, the overall configuration of a liquid fuel synthesizing system (hydrocarbon synthesis reaction system) 1 which carries out the GTL (Gas to Liquids) process according to an embodiment of the invention will be described. FIG. 1 is a view showing the overall configuration of the liquid fuel synthesizing system 1.

As shown in FIG. 1, the liquid fuel synthesizing system 1 according to the present embodiment is a plant facility which carries out the GTL process, which converts a hydrocarbon raw material, such as natural gas, into liquid fuels. This liquid fuel synthesizing system 1 includes a synthesis gas production unit 3, an FT synthesis unit (hydrocarbon synthesis reaction apparatus) 5, and an upgrading unit 7. The synthesis gas production unit 3 reforms natural gas, which is a hydrocarbon raw material, to produce synthesis gas including carbon monoxide gas and hydrogen gas. The FT synthesis unit 5 produces liquid hydrocarbons (hydrocarbon compounds) from the produced synthesis gas by the Fischer-Tropsch synthesis reaction (chemical reaction) (hereinafter referred to as "FT synthesis reaction"). The upgrading unit 7 hydrogenates and hydrocracks the liquid hydrocarbons produced by the FT synthesis reaction to produce liquid fuel products (naphtha, kerosene, gas oil, wax, etc.). Hereinafter, constituent parts of each of these units will be described.

First, the synthesis gas production unit 3 will be described. The synthesis gas production unit 3 mainly includes, for example, a desulfurizing reactor 10, a reformer 12, a waste heat boiler 14, vapor-liquid separators 16 and 18, a $CO_2$ removal unit 20, and a hydrogen separator 26. The desulfurizing reactor 10 is composed of a hydrodesulfurizer, etc., and removes sulfur components from natural gas as a raw material. The reformer 12 reforms the natural gas supplied from the desulfurizing reactor 10, to produce synthesis gas including carbon monoxide gas (CO) and hydrogen gas ($H_2$) as the main components. The waste heat boiler 14 recovers waste heat of the synthesis gas produced by the reformer 12, to produce high-pressure steam. The vapor-liquid separator 16 separates the water heated by heat exchange with the synthesis gas in the waste heat boiler 14 into vapor (high-pressure steam) and liquid. The vapor-liquid separator 18 removes condensate from the synthesis gas cooled down in the waste heat boiler 14, and supplies a gas to the $CO_2$ removal unit 20. The $CO_2$ removal unit 20 has an absorption tower 22 which removes carbon dioxide gas by using an absorbent from the synthesis gas supplied from the vapor-liquid separator 18, and a regeneration tower 24 which desorbs the carbon dioxide gas and regenerates the absorbent including the carbon dioxide gas. The hydrogen separator 26 separates a portion of the hydrogen gas included in the synthesis gas, the carbon dioxide gas of which has been separated by the $CO_2$ removal unit 20. It is to be noted herein that the above $CO_2$ removal unit 20 is not necessarily provided depending on circumstances.

Among them, the reformer 12 reforms natural gas by using carbon dioxide and steam to produce high-temperature synthesis gas including carbon monoxide gas and hydrogen gas as the main components, by a steam and carbon-dioxide-gas reforming method expressed by the following chemical reaction formulas (1) and (2). In addition, the reforming method in this reformer 12 is not limited to the example of the above steam and carbon-dioxide-gas reforming method. For example, a steam reforming method, a partial oxidation reforming method (PDX) using oxygen, an autothermal reforming method (ATR) that is a combination of the partial oxidation method and the steam reforming method, a carbon-dioxide-gas reforming method, and the like can also be utilized.

$$CH_4 + H_2O \rightarrow CO + 3H_2 \qquad (1)$$

$$CH_4 + CO_2 \rightarrow 2CO + 2H_2 \qquad (2)$$

Further, the hydrogen separator 26 is provided on a line branched from an introduction pipe (synthesis gas introduction part) 31 which connects the $CO_2$ removal unit 20 or vapor-liquid separator 18 with the bubble column reactor (reactor) 30. This hydrogen separator 26 can be composed of, for example, a hydrogen PSA (Pressure Swing Adsorption) device which performs adsorption and desorption of hydrogen by using a pressure difference. This hydrogen PSA device has adsorbents (zeolitic adsorbent, activated carbon, alumina, silica gel, etc.) within a plurality of adsorption towers (not shown) which are arranged in parallel. By sequentially repeating processes including pressurizing, adsorption, desorption (pressure reduction), and purging of hydrogen in each of the adsorption towers, high-purity (for example, about 99.999%) hydrogen gas separated from the synthesis gas can be continuously supplied.

In addition, the hydrogen gas separating method in the hydrogen separator 26 is not limited to the example of the pressure swing adsorption method as in the above hydrogen PSA device. For example, there may be a hydrogen storing alloy adsorption method, a membrane separation method, or a combination thereof.

The hydrogen storing alloy method is, for example, a technique of separating hydrogen gas using a hydrogen storing alloy (TiFe, LaNi$_5$, TiFe$_{0.7-0.4}$, Mn$_{0.3-0.1}$, TiMn$_{1.5}$, etc.) having a property which adsorbs or emits hydrogen by being cooled or heated. By providing a plurality of adsorption towers in which a hydrogen storing alloy is contained, and alternately repeating, in each of the adsorption towers, adsorption of hydrogen by cooling of the hydrogen storing alloy and emission of hydrogen by heating of the hydrogen storing alloy, hydrogen gas in the synthesis gas can be separated and recovered.

Further, the membrane separation method is a technique of separating hydrogen gas having excellent membrane permeability out of a mixed gas, using a membrane made of a polymeric material, such as aromatic polyimide. Since this membrane separation method is not accompanied with a phase change, less energy for running is required, and the running cost is low. Further, since the structure of a membrane separation device is simple and compact, the facility cost required is low, and the facility area required is small. Moreover, since there is no driving device in a separation membrane, and a stable running range is wide, there is an advantage in that maintenance and management is easy.

Next, the FT synthesis unit 5 will be described. The FT synthesis unit 5 mainly includes, for example the bubble column reactor 30, a vapor-liquid separator 34, a separator 36, a vapor-liquid separator 38, and a first fractionator 40.

The bubble column reactor 30 carries out FT synthesis reaction of the synthesis gas produced in the above synthesis gas production unit 3, i.e., carbon monoxide and hydrogen, to produce liquid hydrocarbons. In this embodiment, the bubble column reactor 30 is connected with the absorption tower 22 of the $CO_2$ removal unit 20 by the introduction pipe 31 which introduces the synthesis gas into the bubble column reactor 30. The introduction pipe 31 is made of, for example, steel composed of, for example iron, nickel, and so on. The vapor-liquid separator 34 separates the water flowed and heated through a heat transfer pipe 32 disposed in the bubble column reactor 30 into steam (medium-pressure steam) and liquid. The separator 36 is connected to a middle part of the bubble column reactor 30 to separate a catalyst and a liquid hydrocarbon product. The vapor-liquid separator 38 cools down unreacted synthesis gas and gaseous hydrocarbon product drawn from the bubble column reactor 30. In this embodiment, the gas in the bubble column reactor 30 flows through the inside of an outlet pipe (reactor gas outlet part) 39 which is connected to an upper part of the bubble column reactor 30 and allows the gas in the bubble column reactor 30 to be drawn therethrough and the inside of a drawn gas heat exchanger (drawn gas heat-exchange part) 44, which will be described later in this order, and is supplied to the vapor-liquid separator 38. The first fractionator 40 distills the liquid hydrocarbons supplied via the separator 36 and the vapor-liquid separator 38 from the bubble column reactor 30, and separates and refines the liquid hydrocarbons into individual fractions according to boiling points.

Among them, the bubble column reactor 30, which is an example of a reactor which synthesizes synthesis gas into liquid hydrocarbons, functions as a FT synthesizing reactor which synthesizes liquid hydrocarbons from synthesis gas by the FT synthesis reaction. This bubble column reactor 30 is composed of, for example, a bubble column slurry bed type reactor in which the slurry consisting of a catalyst and medium oil is reserved inside a tower container.

This bubble column reactor 30 produces liquid hydrocarbons from synthesis gas by the FT synthesis reaction. In detail, in this bubble column reactor 30, the synthesis gas that is the source gas flows through the introduction pipe 31, is then supplied as bubbles from a sparger at the bottom of the bubble column reactor 30, and passes through the slurry consisting of a catalyst and medium oil, and in a suspended state, hydrogen gas and carbon monoxide gas are brought into a synthesis reaction, as shown in the following chemical reaction formula (3).

$$2nH_2 + nCO \rightarrow (-CH_2-)_n + nH_2O \qquad (3)$$

Since this FT synthesis reaction is an exothermic reaction, the bubble column reactor 30, which is a heat exchanger type reactor within which the heat transfer pipe 32 is disposed, is adapted such that, for example, water (BFW: Boiler Feed Water) is supplied as a coolant so that reaction heat of the above FT synthesis reaction can be recovered as medium-pressure steam by heat exchange between slurry and water. In addition, the unreacted synthesis gas, gas hydrocarbon product, etc. in the bubble column reactor 30 are heated, rise, and are drawn from the outlet pipe 39 by the heat generation of the FT synthesis reaction.

In this embodiment, the FT synthesis unit 5 is provided at the introduction pipe 31, and includes a synthesis gas heating part 42 which heats the synthesis gas introduced into the bubble column reactor 30 to the decomposition temperature of a carbonyl compound or higher. In the illustrated example, the synthesis gas heating part 42 heats the synthesis gas introduced into the bubble column reactor 30 to the decomposition temperature of an iron-carbonyl compound or a nickel-carbonyl compound or higher. Further, the synthesis gas heating part 42 includes a drawn gas heat exchanger 44 which heats the synthesis gas by using the heat of the gas in the bubble column reactor 30 drawn from the outlet pipe 39, and a steam heat exchanger (steam heat-exchange part) 46 which heats the synthesis gas by using steam.

Both the drawn gas heat exchanger 44 and the steam heat exchanger 46 are provided at the introduction pipe 31. In this embodiment, the steam heat exchanger 46 is provided nearer to the bubble column reactor 30 than the drawn gas heat exchanger 44 in the introduction pipe 31.

The gas heated by the heat generated through the FT synthesis reaction in the bubble column reactor 30 is supplied to the drawn gas heat exchanger 44 via the outlet pipe 39. Then, the drawn gas heat exchanger 44 can heat the synthesis gas in the introduction pipe 31 by the heat exchange between the supplied gas and the synthesis gas in the introduction pipe 31.

The steam heat exchanger 46 heats the synthesis gas in the introduction pipe 31 by using the steam produced when natural gas is reformed in the synthesis gas production unit 3. In this embodiment, high-pressure steam is supplied to the steam heat exchanger 46 from the vapor-liquid separator 16 of the synthesis gas production unit 3. Then, the steam heat exchanger 46 can heat the synthesis gas in the introduction pipe 31 by the heat exchange between the supplied high-pressure steam and the synthesis gas in the introduction pipe 31.

The synthesis gas in the introduction pipe 31 is heated by the synthesis gas heating part 42 so as to have, for example, a temperature of 140° C. or higher, preferably 140° C. or higher and the reaction temperature (reaction temperature inside the reactor) (for example, 230° C.) of the FT synthesis reaction, which is a chemical reaction within the bubble column reactor 30, or lower, and more preferably 200° C. or higher and the reaction temperature (for example, 230° C.) of the FT synthesis reaction or lower when being introduced into the bubble column reactor 30.

Finally, the upgrading unit 7 will be described. The upgrading unit 7 includes, for example, a wax fraction hydrocracking reactor 50, a kerosene and gas oil fraction hydrotreating reactor 52, a naphtha fraction hydrotreating reactor 54, vapor-liquid separators 56, 58 and 60, a second fractionator 70, and a naphtha stabilizer 72. The wax fraction hydrocracking reactor 50 is connected to a lower part of the first fractionator 40. The kerosene and gas oil fraction hydrotreating reactor 52 is connected to the middle part of the first fractionator 40. The naphtha fraction hydrotreating reactor 54 is connected to an upper part of the first fractionator 40. The vapor-liquid separators 56, 58 and 60 are provided so as to correspond to the hydrogenation reactors 50, 52 and 54, respectively. The second fractionator 70 separates and refines the liquid hydrocarbons supplied from the vapor-liquid separators 56 and 58 according to boiling points. The naphtha stabilizer 72 distills liquid hydrocarbons of a naphtha fraction supplied from the vapor-liquid separator 60 and the second fractionator 70. Then the naphtha stabilizer 72 discharges components lighter than butane toward flare gas, and separates and recovers components having a carbon number of five or more as a naphtha product.

Next, a process (GTL process) of synthesizing liquid fuel from natural gas by the liquid-fuel synthesizing system 1 configured as above will be described.

Natural gas (whose main component is $CH_4$) as a hydrocarbon raw material is supplied to the liquid fuel synthesizing system 1 from an external natural gas supply source (not shown), such as a natural gas field or a natural gas plant. The above synthesis gas production unit 3 reforms this natural gas to produce synthesis gas (mixed gas including carbon monoxide gas and hydrogen gas as main components).

Specifically, first, the above natural gas that is the hydrocarbon raw material is supplied to the desulfurizing reactor 10 along with the hydrogen gas separated by the hydrogen separator 26. The desulfurizing reactor 10 hydrogenates and desulfurizes sulfur components included in the natural gas using the hydrogen gas, with, for example, a ZnO catalyst. By desulfurizing natural gas in advance in this way, it is possible to prevent a decrease in activity of a catalyst used in the reformer 12, the bubble column reactor 30, etc. by sulfur compounds.

The natural gas (may also contain carbon dioxide) desulfurized in this way is supplied to the reformer 12 after the carbon dioxide ($CO_2$) gas supplied from a carbon-dioxide supply source (not shown) is mixed with the steam generated in the waste heat boiler 14. The reformer 12 reforms natural gas by using carbon dioxide and steam to produce high-temperature synthesis gas including carbon monoxide gas and hydrogen gas as main components, by the above steam and carbon-dioxide-gas reforming method. At this time, the reformer 12 is supplied with, for example, fuel gas for a burner disposed in the reformer 12 and air, and reaction heat required for the above steam and $CO_2$ reforming reaction, which is an endothermic reaction, is provided by the heat of combustion of the fuel gas in the burner.

The high-temperature synthesis gas (for example, 900° C., 2.0 MPaG) produced in the reformer 12 in this way is supplied to the waste heat boiler 14, and is cooled down by the heat exchange with the water which flows through the waste heat boiler 14 (for example, 400° C.), thus the waste heat is recovered. At this time, the water heated by the synthesis gas in the waste heat boiler 14 is supplied to the vapor-liquid separator 16. From this vapor-liquid separator 16, a gas component is supplied to the reformer 12 or other external devices as high-pressure steam (for example, 3.4 to 10.0 MPaG), and water as a liquid component is returned to the waste heat boiler 14.

Meanwhile, the synthesis gas cooled down in the waste heat boiler 14 is supplied to the absorption tower 22 of the $CO_2$ removal unit 20, or the bubble column reactor 30, after condensate is separated and removed from the synthesis gas in the vapor-liquid separator 18. The absorption tower 22 absorbs carbon dioxide gas included in the synthesis gas into the retained absorbent, to separate the carbon dioxide gas from the synthesis gas. The absorbent including the carbon dioxide gas within this absorption tower 22 is introduced into the regeneration tower 24, the absorbent including the carbon dioxide gas is heated and subjected to stripping treatment with, for example, steam, and the resulting desorbed carbon dioxide gas is recycled to the reformer 12 from the regeneration tower 24, and is reused for the above reforming reaction.

The synthesis gas produced in the synthesis gas production unit 3 in this way is supplied to the bubble column reactor 30 of the above FT synthesis unit 5. At this time, the composition ratio of the synthesis gas supplied to the bubble column reactor 30 is adjusted to a composition ratio (for example, $H_2$:CO=2:1 (molar ratio)) suitable for the FT synthesis reaction. In addition, the pressure of the synthesis gas supplied to the bubble column reactor 30 is raised to a pressure (for example, about 3.6 MPaG) suitable for the FT synthesis reaction by a compressor (not shown) provided in a pipe which connects the $CO_2$ removal unit 20 with the bubble column reactor 30.

Further, a portion of the synthesis gas, the carbon dioxide gas of which has been separated by the above $CO_2$ removal unit 20, is also supplied to the hydrogen separator 26. The hydrogen separator 26 separates the hydrogen gas included in the synthesis gas, by the adsorption and desorption (hydrogen PSA) utilizing a pressure difference as described above. This separated hydrogen is continuously supplied from a gas holder (not shown), etc. via a compressor (not shown) to various hydrogen-utilizing reaction devices (for example, the desulfurizing reactor 10, the wax fraction hydrocracking reactor 50, the kerosene and gas oil fraction hydrotreating reactor 52, the naphtha fraction hydrotreating reactor 54, etc.) which perform predetermined reactions utilizing hydrogen within the liquid fuel synthesizing system 1.

Next, the above FT synthesis unit 5 synthesizes liquid hydrocarbons by the FT synthesis reaction from the synthesis gas produced by the above synthesis gas production unit 3.

Specifically, the synthesis gas from which the carbon dioxide gas has been separated in the above $CO_2$ removal unit 20 flows through the introduction pipe 31, and is introduced into the bubble column reactor 30. Here, the synthesis gas flowing through the introduction pipe 31 is cooled down to, for example about 40° C. at the introduction pipe 31 by a heat exchanger (not shown) set between the waste heat boiler 14 and the synthesis gas heating part 42 in order to remove moisture included in the synthesis gas until the synthesis gas reaches the synthesis gas heating part 42 after being cooled by the waste heat boiler 14. Thus, in this embodiment, this cooled synthesis gas is heated by the synthesis gas heating part 42 to, for example, about 200° C. when the synthesis gas is introduced into the bubble column reactor 30.

Thereafter, the heated synthesis gas flows in from the bottom of the bubble column reactor 30, and flows up in the catalyst slurry reserved in the bubble column reactor 30. At this time, within the bubble column reactor 30, the carbon monoxide and hydrogen gas which are included in the synthesis gas react with each other by the FT synthesis reaction, thereby producing hydrocarbons. Moreover, by flowing water through the heat transfer pipe 32 of the bubble column reactor 30 at the time of this synthesis reaction, the reaction heat of the FT synthesis reaction is removed, and the water heated by this heat exchange is vaporized into steam. As for this steam, the water liquefied in the vapor-liquid separator 34 is returned to the heat transfer pipe 32, and a gas component is supplied to an external device as medium-pressure steam (for example, 1.0 to 2.5 MPaG). In addition, the internal pressure of the bubble column reactor 30 becomes, for example, about 3.2 MPaG by the FT synthesis reaction. Further, the reaction temperature in the bubble column reactor 30 is maintained at, for example, about 230° C. by the reaction heat of the FT synthesis reaction and by the cooling by the heat transfer tube 32.

The slurry containing the liquid hydrocarbons synthesized in the bubble column reactor 30 in this way are drawn from the middle part of the bubble column reactor 30, and is introduced into the separator 36. The separator 36 separates the drawn slurry into a catalyst (solid component), and a liquid component including a liquid hydrocarbon product. A part of the separated catalyst is returned to the bubble column reactor 30, and the liquid component is supplied to the first fractionator 40.

Furthermore, the unreacted synthesis gas and a gas component of the synthesized hydrocarbons are drawn via the outlet pipe 39 from the top of the bubble column reactor 30, and these gases flow through the drawn gas heat exchanger 44 where heat exchange is performed as will be described later, and are then introduced into the vapor-liquid separator 38. The vapor-liquid separator 38 cools down these gases to separate some condensed liquid hydrocarbons to introduce them into the first fractionator 40. Meanwhile, as for the gas component separated in the vapor-liquid separator 38, the unreacted synthesis gases (CO and $H_2$) flow between the waste heat boiler 14 and the synthesis gas heating part 42 in the introduction pipe 31, are heated by the synthesis gas heating part 42, are then returned to the bottom of the bubble column reactor 30 again, and are reused for the FT synthesis reaction. Moreover, the emission gas (flare gas) other than the target products, including hydrocarbon gas having a small carbon number (equal to or less than $C_4$) as a main component, is introduced into an external combustion facility (not shown), is combusted therein, and is then emitted to the atmosphere.

Here, the operation of the synthesis gas heating part 42 before and after the FT synthesis reaction in the bubble column reactor 30 will be described.

First, since the gas heated by the drawn gas heat exchanger 44 is not supplied before the FT synthesis reaction within the bubble column reactor 30 immediately after the liquid-fuel synthesizing system 1 is started, the synthesis gas cannot be heated by the drawn gas heat exchanger 44. Thus, the synthesis gas is heated only by the steam heat exchanger 46.

Next, since the gas in the bubble column reactor 30 heated by the FT synthesis reaction is supplied to the drawn gas heat exchanger 44 via the outlet pipe 39 after the FT synthesis reaction within the bubble column reactor 30, the synthesis gas in the introduction pipe 31 can be heated by the drawn gas heat exchanger 44. Therefore, the synthesis gas in the introduction pipe 31 is heated by both the drawn gas heat exchanger 44 and the steam heat exchanger 46. At this time, the synthesis gas in the introduction pipe 31 is first heated to, for example, about 150° C. by the drawn gas heat exchanger 44, and then heated to become about 200° C. by the steam heat exchanger 46 when being introduced into the bubble column reactor 30.

In addition, as for the operation of the synthesis gas heating part 42, even either before or after the FT synthesis reaction in the bubble column reactor 30, a temperature measuring part (not shown) may be provided at a connecting portion between the introduction pipe 31 and the bubble column reactor 30 so as to adjust the amount of the high-pressure steam supplied to the steam heat exchanger 46 while measuring the temperature of the synthesis gas in the introduction pipe 31.

Next, steps of the first fractionator 40 and thereafter will be described. The first fractionator 40 heats the liquid hydrocarbons (whose carbon numbers are various) supplied via the separator 36 and the vapor-liquid separator 38 from the bubble column reactor 30 as described above, to fractionally distill the liquid hydrocarbons utilizing a difference in boiling point. Thereby, the first fractionator 40 separates and refines the liquid hydrocarbons into a naphtha fraction (whose boiling point is lower than about 150° C.), a kerosene and gas oil fraction (whose boiling point is about 150 to 350° C.), and a wax fraction (whose boiling point is higher than about 350° C.). The liquid hydrocarbons (mainly $C_{21}$ or more) as the wax fraction drawn from the bottom of the first fractionator 40 are brought to the wax fraction hydrocracking reactor 50, the liquid hydrocarbons (mainly $C_{11}$ to $C_{20}$) as the kerosene and gas oil fraction drawn from the middle part of the first fractionator 40 are brought to the kerosene and gas oil fraction hydrotreating reactor 52, and the liquid hydrocarbons (mainly $C_s$ to $C_{10}$) as the naphtha fraction drawn from the upper part of the first fractionator 40 are brought to the naphtha fraction hydrotreating reactor 54.

The wax fraction hydrocracking reactor 50 hydrocracks the liquid hydrocarbons of wax fraction with a large carbon number (approximately $C_{21}$ or more), which has been supplied from the lower part of the first fractionator 40, by using the hydrogen gas supplied from the above hydrogen separator 26, to reduce the carbon number to $C_{20}$ or less. In this hydrocracking reaction, hydrocarbons with a small carbon number and with low molecular weight are produced by cleaving the C—C bonds of the hydrocarbons with a large carbon number, using a catalyst and heat. A product including the liquid hydrocarbons hydrocracked by this wax fraction hydrocracking reactor 50 is separated into gas and liquid in the vapor-liquid separator 56, the liquid hydrocarbons of which are brought to the second fractionator 70, and the gas component (including hydrogen gas) of which is brought to the kerosene and gas oil fraction hydrotreating reactor 52 and the naphtha fraction hydrotreating reactor 54.

The kerosene and gas oil fraction hydrotreating reactor 52 hydrotreats liquid hydrocarbons (approximately $C_{11}$ to $C_{20}$) as the kerosene and gas oil fractions having an approximately middle carbon number, which have been supplied from the middle part of the first fractionator 40, by using the hydrogen gas supplied via the wax fraction hydrocracking reactor 50 from the hydrogen separator 26. In this hydrotreating reaction, in order to obtain mainly side-chain saturated hydrocarbons, the liquid hydrocarbons are isomerized, and hydrogen are added to unsaturated bonds of the above liquid hydrocarbons to saturate the liquid hydrocarbons. As a result, a product including the hydrotreated liquid hydrocarbons is separated into gas and liquid in the vapor-liquid separator 58, the liquid hydrocarbons of which are brought to the second fractionator 70, and the gas component (including hydrogen gas) of which is reused for the above hydrogenation reaction.

The naphtha fraction hydrotreating reactor 54 hydrotreats liquid hydrocarbons of naphtha fraction with a low carbon number (approximately $C_{10}$ or less), which have been supplied from the upper part of the first fractionator 40, by using the hydrogen gas supplied via the wax fraction hydrocracking reactor 50 from the hydrogen separator 26. As a result, a product including the hydrotreated liquid hydrocarbons is separated into gas and liquid in the vapor-liquid separator 60, the liquid hydrocarbons of which are brought to the naphtha stabilizer 72, and the gas component (including hydrogen gas) of which is reused for the above hydrogenation reaction.

Next, the second fractionator 70 distills the liquid hydrocarbons supplied from the wax fraction hydrocracking reactor 50 and the kerosene and gas oil fraction hydrotreating reactor 52 as described above. Thereby, the second fractionator 70 separates and refines the liquid hydrocarbons into hydrocarbons (whose boiling point is less than about 150° C.) with a carbon number of $C_{10}$ or less, kerosene (whose boiling point is about 150 to 250° C.), gas oil (whose boiling point is about 250 to 350° C.), and uncracked wax fraction (whose boiling point is higher than about 350° C.) from the wax fraction hydrocracking reactor 50. The gas oil is drawn from a lower part of the second fractionator 70, and the kerosene is drawn from a middle part thereof. Meanwhile, a hydrocarbon with a carbon number of $C_{10}$ or less is drawn from the top of the second fractionator 70, and is supplied to the naphtha stabilizer 72.

Moreover, the naphtha stabilizer 72 distills the hydrocarbons with a carbon number of $C_{10}$ or less, which have been supplied from the above naphtha fraction hydrotreating reactor 54 and second fractionator 70. Thereby, the naphtha stabilizer 72 separates and refines naphtha ($C_5$ to $C_{10}$) as a product. Accordingly, high-purity naphtha is drawn from a lower part of the naphtha stabilizer 72. Meanwhile, the emission gas (flare gas) other than products, which contains as a main component hydrocarbons with a carbon number lower than or equal to a predetermined number (lower than or equal to $C_4$), is discharged from the top of the naphtha stabilizer 72.

The process (GTL process) of the liquid fuel synthesizing system 1 has been described above. By the GTL process concerned, natural gas can be easily and economically converted into clean liquid fuels, such as high-purity naphtha ($C_5$ to $C_{10}$: raw gasoline), lamp oil ($C_{11}$ to $C_{15}$: kerosene), and light oil ($C_{16}$ to $C_{20}$: gas oil). Moreover, in the present embodiment, the above steam and carbon-dioxide-gas reforming method is adopted in the reformer 12. Thus, there are advantages in that carbon dioxide contained in natural gas can be effectively utilized as a raw material, the composition ratio (for example, $H_2$:CO=2:1 (molar ratio)) of a synthesis gas suitable for the above FT synthesis reaction can be efficiently generated in one reaction of the reformer 12, and a hydrogen concentration adjustor, etc. is unnecessary.

Particularly, according to the FT synthesis unit 5 including the liquid-fuel synthesizing system 1 related to the present invention, the synthesis gas heating part 42 is provided in the introduction pipe 31 to heat the synthesis gas introduced into the bubble column reactor 30 to the decomposition temperature of a carbonyl compound or higher. Thus, the carbonyl compound included in the synthesis gas in the introduction pipe 31 can be decomposed before being supplied to the slurry contained in the bubble column reactor 30. For this reason, it is possible to suppress deterioration of the catalyst particles in the slurry and to efficiently synthesize liquid hydrocarbons. As a result, liquid hydrocarbons can be synthesized at low cost as compared with the case where there is no synthesis gas heating part 42.

Further, since the synthesis gas introduced into the bubble column reactor 30 is heated to the decomposition temperature of an iron-carbonyl compound or a nickel-carbonyl compound or higher, for example, even when the introduction pipe 31 is made of steel including iron or nickel as the main components, and an iron-carbonyl compound or a nickel-carbonyl compound is produced in the synthesis gas while the synthesis gas flows through the introduction pipe 31, it is possible to decompose these compounds before the synthesis gas is supplied to the slurry contained in the bubble column reactor 30, and deterioration of the catalyst particles in the slurry can be reliably suppressed.

Moreover, the gas in the bubble column reactor 30 heated by the heat generation of the FT synthesis reaction can be drawn from the outlet pipe 39, and the synthesis gas introduced into the bubble column reactor 30 can be heated by the drawn gas heat exchanger 44 using the heat of this drawn gas. Accordingly, it is possible to effectively use the heat generated by the FT synthesis reaction to enhance the energy efficiency of the FT synthesis unit 5, and it is possible to save energy.

Furthermore, since the synthesis gas heating part 42 includes the steam heat exchanger 46 using steam separately from the drawn gas heat exchanger 44, the synthesis gas can be reliably heated by steam even before the FT synthesis reaction within the bubble column reactor 30. For this reason, deterioration of the catalyst particles in the slurry can be more reliably suppressed.

Additionally, after the FT synthesis reaction is performed within the bubble column reactor 30, the synthesis gas can be heated using both the drawn gas heat exchanger 44 and the steam heat exchanger 46. Thus, it is possible to reduce the amount of the steam used for the steam heat exchanger 46, and it is possible to attain energy saving and low running cost of the steam heat exchanger 46. In addition, since the steam heat exchanger 46 is provided nearer to the bubble column reactor 30 than the drawn gas heat exchanger 44 in the introduction pipe 31, the synthesis gas before being introduced into the bubble column reactor 30 can be reliably heated to the decomposition temperature or higher by the steam heat exchanger 46 whose temperature can be easily controlled.

Furthermore, since the synthesis gas heating part 42 heats the synthesis gas to 140° C. or higher which is the decomposition temperature of $Fe_3(CO)_{12}$ (dodecacarbonyl triiron), the iron-carbonyl compound and nickel-carbonyl compound included in the synthesis gas in the introduction pipe 31 can be reliably decomposed. In addition, as for the decomposition temperature of other iron-carbonyl compounds with a fewer number of carbonyl groups than $Fe_3(CO)_{12}$ among iron-carbonyl compounds, for example, the decomposition temperature of $Fe_2(CO)_9$ is about 100° C., and the decomposition temperature of $Fe(CO)_5$ is about 77° C. Moreover, as for the decomposition temperature of nickel-carbonyl compounds, for example, the decomposition temperature of $Ni(CO)_4$ is about 127° C. All the decomposition temperatures are equal to or less than 140° C.

Moreover, the synthesis gas heating part 42 heats the synthesis gas in the introduction pipe 31 to the temperature equal to or lower than the reaction temperature of the FT synthesis reaction in the bubble column reactor 30 while heating the synthesis gas to 140° C. or higher. Accordingly, even if the heated synthesis gas is introduced into the bubble column reactor 30, the inside of the bubble column reactor 30 is not excessively heated, and the FT synthesis reaction is stably performed. Thus, the liquid hydrocarbons can be more efficiently synthesized.

Additionally, the synthesis gas heating part 42 heats the synthesis gas in the introduction pipe 31 to particularly 200° C. or higher even while heating the synthesis gas to 140° C. or higher. Accordingly, a carbonyl compound can be more reliably decomposed.

Furthermore, since the liquid-fuel synthesizing system 1 according to this embodiment includes the FT synthesis unit 5 which exhibits the aforementioned effects, production of liquid fuels can be efficiently performed at a low cost.

Moreover, since the synthesis gas heating part 42 heats the synthesis gas using the high-pressure steam generated in the vapor-liquid separator 16 when natural gas is reformed, there is no need of separately providing a heat source facility which supplies the heat required for the synthesis gas heating part 42, the liquid-fuel synthesizing system 1 can be compact, and the facility cost and running cost of the liquid-fuel synthesizing system can be reduced.

Although the preferred embodiments of the invention have been described with reference to the accompanying drawing, the invention is not limited to such embodiments. It is apparent to those skilled in the art that various alternations or modifications can be made in the category as set forth in the claims, and it will be understood that these alternations or modifications naturally belongs to the technical scope of the present invention.

For example, in the above embodiments, natural gas is used as a hydrocarbon raw material to be supplied to the liquid-fuel synthesizing system 1. However, the invention is not limited to such an example. For example, other hydrocarbon raw materials, such as asphalt and residual oil, may be used.

Furthermore, in the above embodiments, the liquid hydrocarbons are synthesized by the FT synthesis reaction as a synthesis reaction in the bubble column reactor 30. However, the invention is not limited to this example. Specifically, the invention can also be applied to, for example, oxo synthesis (hydroformylation reaction) "$R—CH=CH_2\ CO+H_2 \rightarrow R—CH_2CH_2CHO$", methanol synthesis "$CO+2H_2 \rightarrow CH_3OH$", dimethylether (DME) synthesis "$3CO+3H_2 \rightarrow CH_3OCH_3 + CO_2$", etc., as the synthesis reaction in the bubble column reactor 30.

Further, in the above embodiment, the synthesis gas heating part 42 includes the drawn gas heat exchanger 44 and the steam heat exchanger 46. However, the synthesis gas heating part may include only one of the heat exchangers, or heating may be performed using other configurations (for example, a rapid heating method of a pipe by an induction furnace) which are different from these configurations.

Furthermore, in the above embodiment, the steam heat exchanger 46 heats the synthesis gas is using the steam generated when natural gas is reformed in the synthesis gas production unit 3. However, the synthesis gas may be heated not using this steam, but using the steam of a heat source facility which is separately provided or using separate steam generated within the liquid-fuel synthesizing system 1.

Moreover, in the above embodiment, the synthesis gas heating part 42 heats the synthesis gas introduced into the bubble column reactor 30 to the decomposition temperature of an iron-carbonyl compound or a nickel-carbonyl compound or higher. Instead of this, however, the synthesis gas may be heated to the decomposition temperature of carbonyl compounds or higher (for example, a compound of carbonyl and metal which contacts the synthesis gas while the synthesis gas flows before being introduced into the bubble column reactor 30) other than the iron-carbonyl compound and the nickel-carbonyl compound.

In addition, it is possible to suitably substitute the components in the aforementioned constructional elements with well-known constructional elements departing from the major point of the invention, and the aforementioned modified examples may be suitably combined with each other.

INDUSTRIAL APPLICABILITY

The hydrocarbon synthesis reaction apparatus, the hydrocarbon synthesizing method, and the hydrocarbon synthesis reaction system including the hydrocarbon synthesis reaction apparatus according to the present invention can suppress the deterioration of the catalyst particles in the slurry, efficiently synthesize the hydrocarbon compound, and synthesize the hydrocarbon compound at low cost.

DESCRIPTION OF REFERENCE NUMERALS

1: LIQUID-FUEL SYNTHESIZING SYSTEM (HYDROCARBON SYNTHESIS REACTION SYSTEM)
3: SYNTHESIS GAS PRODUCTION UNIT
5: FT SYNTHESIS UNIT (HYDROCARBON SYNTHESIS REACTION APPARATUS)
7: UPGRADING UNIT

30: BUBBLE COLUMN REACTOR (REACTOR)
31: INTRODUCTION PIPE (SYNTHESIS GAS INTRODUCTION PART)
39: OUTLET PIPE (REACTOR GAS OUTLET PART)
42: SYNTHESIS GAS HEATING PART
44: DRAWN GAS HEAT EXCHANGER (DRAWN GAS HEAT-EXCHANGE PART)
46: STEAM BEAT EXCHANGER (STEAM HEAT-EXCHANGE PART)

The invention claimed is:

1. A hydrocarbon synthesis reaction apparatus for synthesizing a hydrocarbon compound by a chemical reaction of a synthesis gas including hydrogen and carbon monoxide as the main components, and a slurry having solid catalyst particles suspended in a liquid, the hydrocarbon synthesis reaction apparatus comprising:
   a reactor which is configured to contain the slurry;
   a synthesis gas introduction part for introducing the synthesis gas into the reactor; and
   a synthesis gas heating part which is provided in the synthesis gas introduction part for heating the synthesis gas to be introduced into the reactor to the decomposition temperature of carbonyl compounds or higher, wherein the synthesis gas heating part includes at least one of:
   (i) a drawn gas heat-exchange part for heating the synthesis gas by using the heat of a gas drawn from a reactor gas outlet part, wherein said reactor gas outlet part is disposed in the hydrocarbon synthesis reaction apparatus for drawing the gas from the reactor heated by the heat generated by the chemical reaction therein, and
   (ii) a steam heat-exchange part for heating the synthesis gas by using a steam.

2. The hydrocarbon synthesis reaction apparatus according to claim 1, wherein
   the synthesis gas heating part heats the synthesis gas to 140° C. or higher and a reaction temperature inside the reactor or lower.

3. A hydrocarbon synthesis reaction system comprising:
   the hydrocarbon synthesis reaction apparatus according to claim 1;
   a synthesis gas production unit for reforming a hydrocarbon raw material to produce the synthesis gas and introducing the synthesis gas to the synthesis gas introduction part of the hydrocarbon synthesis reaction apparatus; and
   an upgrading unit for refining the hydrocarbon compounds into liquid fuels.

4. The hydrocarbon synthesis reaction system according to claim 3, wherein
   the synthesis gas heating part heats the synthesis gas in the synthesis gas introduction part by using steam generated when the hydrocarbon raw material is reformed in the synthesis gas production unit.

5. A hydrocarbon synthesizing method, comprising:
   reforming a hydrocarbon raw material to produce a synthesis gas including hydrogen and carbon monoxide as the main components;
   heating the synthesis gas to the decomposition temperature of a carbonyl compound or higher using at least one of (i) a gas drawn from a reactor heated by heat generated by the chemical reaction in the reactor, and (ii) a steam generated when the hydrocarbon raw material is reformed;
   synthesizing a hydrocarbon compound by a chemical reaction of the heated synthesis gas, and a slurry having solid catalyst particles suspended in a liquid.

6. The hydrocarbon synthesizing method according to claim 5, wherein the synthesis gas is heated by the gas drawn from the reactor, and thereafter is heated by the steam.

7. The hydrocarbon synthesizing method according to claim 5, wherein the synthesis gas is heated to 140° C. or higher and a reaction temperature inside the reactor or lower.

* * * * *

UNITED STATES PATENT AND TRADEMARK OFFICE
CERTIFICATE OF CORRECTION

PATENT NO.        : 8,586,640 B2
APPLICATION NO.   : 12/998191
DATED             : November 19, 2013
INVENTOR(S)       : Yasuhiro Onishi et al.

Page 1 of 1

It is certified that error appears in the above-identified patent and that said Letters Patent is hereby corrected as shown below:

In the Specification

Column 1, line 18, change "priority to Priority is claimed en:" to -- priority to --;

Column 5, line 28, change "(PDX)" to -- (POX) --;

Column 11, line 12, change "(mainly $C_s$ to $C_{10}$)" to -- (mainly $C_5$ to $C_{10}$) --;

Column 14, line 14, change ""R-CH=CH$_2$  CO + H$_2$ → R-CH$_2$CH$_2$CHO","
to -- "R-CH=CH$_2$ + CO + H$_2$ → R-CH$_2$CH$_2$CHO", --.

Signed and Sealed this
Twelfth Day of August, 2014

Michelle K. Lee
*Deputy Director of the United States Patent and Trademark Office*